US011177518B2

United States Patent
Hwang

(10) Patent No.: US 11,177,518 B2
(45) **Date of Patent: *Nov. 16, 2021**

(54) HEAT-RADIATING CARTRIDGE, AND BATTERY PACK FOR ELECTRIC VEHICLE USING SAME

(71) Applicant: AMOGREENTECH CO., LTD., Gimpo-si (KR)

(72) Inventor: Seung Jae Hwang, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 88 days.

This patent is subject to a terminal disclaimer.

(21) Appl. No.: 16/086,918

(22) PCT Filed: Mar. 29, 2017

(86) PCT No.: PCT/KR2017/003398
§ 371 (c)(1),
(2) Date: Sep. 20, 2018

(87) PCT Pub. No.: WO2017/171389
PCT Pub. Date: Oct. 5, 2017

(65) Prior Publication Data

US 2019/0109353 A1 Apr. 11, 2019

(30) Foreign Application Priority Data

Mar. 29, 2016 (KR) ........................ 10-2016-0037556
Mar. 29, 2016 (KR) ........................ 10-2016-0037559

(51) Int. Cl.
*H01M 10/00* (2006.01)
*H01M 10/6551* (2014.01)
(Continued)

(52) U.S. Cl.
CPC ..... *H01M 10/6551* (2015.04); *H01M 10/613* (2015.04); *H01M 10/625* (2015.04);
(Continued)

(58) Field of Classification Search
CPC .......................... H01M 10/653; H01M 10/655
See application file for complete search history.

(56) References Cited

U.S. PATENT DOCUMENTS 9,929,427 B2 * 3/2018 Lee .................. H01M 10/0413
10,497,910 B2 * 12/2019 Lee .................... H01M 2/1077
(Continued)

FOREIGN PATENT DOCUMENTS

KR 20090107443 10/2009
KR 101307992 9/2013
(Continued)

OTHER PUBLICATIONS

International Search Report—PCT/KR2017/003398 dated Jul. 21, 2017.

*Primary Examiner* — Milton I Cano
*Assistant Examiner* — Mary G Henshaw
(74) *Attorney, Agent, or Firm* — Cantor Colburn LLP

(57) ABSTRACT

Provided is a heat dissipation cartridge, and a battery pack for an electric vehicle using the heat dissipation cartridge. The heat dissipation cartridge comprises a frame structure including a receiving through-hole formed in a central region so as to receive a pair of batteries and a seating part formed on a side wall of the receiving through-hole for seating the pair of batteries, wherein the frame structure is formed of heat-dissipating plastic and in which an aluminum frame is insert injection-molded.

11 Claims, 8 Drawing Sheets

601a
602a
602
610
600
601
L2
L1

(51) Int. Cl.

| | |
|---|---|
| ***H01M 10/625*** | (2014.01) |
| ***H01M 10/613*** | (2014.01) |
| ***H01M 10/655*** | (2014.01) |
| ***H01M 10/653*** | (2014.01) |
| ***H01M 50/20*** | (2021.01) |
| ***H01M 50/24*** | (2021.01) |
| ***H01M 10/6554*** | (2014.01) |
| *H01M 10/647* | (2014.01) |

(52) U.S. Cl.
CPC ....... *H01M 10/653* (2015.04); *H01M 10/655* (2015.04); *H01M 10/6554* (2015.04); *H01M 50/20* (2021.01); *H01M 50/24* (2021.01); *H01M 10/647* (2015.04); *H01M 2220/20* (2013.01)

(56) References Cited

U.S. PATENT DOCUMENTS

2011/0117410 A1* 5/2011 Yoon ................. H01M 10/6555 429/120
2014/0370339 A1* 12/2014 Kim .................. H01M 10/6552 429/72

FOREIGN PATENT DOCUMENTS

KR 20150047030 5/2015
KR 20150067453 6/2015
KR 20160016498 2/2016
KR 20160028849 3/2016
WO WO-2016017983 A1 * 2/2016 .......... H01M 2/1094

* cited by examiner

HEAT-RADIATING CARTRIDGE, AND BATTERY PACK FOR ELECTRIC VEHICLE USING SAME

TECHNICAL FIELD

The present invention relates generally to a heat dissipation cartridge and, more particularly, to a heat dissipation cartridge that can reduce manufacturing cost, improve heat dissipation characteristics, obtain uniform heat dissipation performance, obtain superior strength, and prevent deformation, and a battery pack for an electric vehicle using the same.

BACKGROUND ART

Currently, demand for thin energy storage devices for electric vehicles, portable phone, notebook computers, digital cameras, and the like is rapidly increasing.

Such thin energy storage devices use secondary cells. The use of lithium (Li) secondary cells, among such secondary cells, is increasing, since Li secondary cells have high energy density and enable high-power driving.

Li secondary cells are fabricated as pouch batteries to have a thin structure, and a high-capacity battery package can advantageously be provided in a small area by connecting a number of pouch batteries.

Although the number of pouch batteries connected together increases the capacity, it is difficult to operate the batteries for a long time, since heat generated during charging and discharging the batteries is concentrated in a small area.

Currently, it is necessary to develop a technology outwardly extracting heat from pouch batteries.

Korean Patent Application Publication No. 2009-0107443 discloses a heat dissipation plate sandwiched between battery cells. The heat dissipation plate includes a composite sheet comprised of a matrix resin and a thermally conductive filler contained in the matrix resin. Carbon fibers are inserted within the composite sheet to extend from the inside of the composite sheet to peripheral portions of the heat dissipation plate.

When the heat dissipation plate of the related art is sandwiched between layers of battery cells when batteries are stacked, the thickness of a battery module is increased by the thickness of the heat dissipation plate. This consequently reduces the number of batteries to be stacked in the same area, thereby reducing capacity, which is problematic.

In addition, the related art disadvantageously increases manufacturing cost by an amount corresponding to the number of added heat dissipation plates.

DISCLOSURE

Technical Problem

Accordingly, the present invention has been made keeping in mind the above problems occurring in the prior art, and an object of the present invention is to provide a heat dissipation cartridge that can reduce manufacturing cost, improve heat dissipation characteristics, obtain uniform heat dissipation performance, obtain superior strength, and prevent deformation, and a battery pack for an electric vehicle using the same.

Another object of the invention is to provide heat dissipation cartridge that can obtain high capacity by increasing number of batteries that can be stacked and put together in a predetermined area, and a battery pack for an electric vehicle using the same.

Another object of the invention is to provide heat dissipation cartridge that can efficiently dissipate heat generated by batteries and a battery pack for an electric vehicle using the same.

Technical Solution

According to an embodiment of the present invention for realizing one or more of the foregoing objects, a heat dissipation cartridge may include a frame structure injection-molded from a heat dissipation plastic to accommodate a pair of batteries. The frame structure may include: an accommodating through-hole provided in a central area; and a seating portion provided on a wall of the accommodating through-hole to allow a pair of batteries to be accommodated.

The frame structure may include: a heat dissipation plastic frame portion having the seating portion surrounding the accommodating through-hole in which the pair of batteries is accommodated; and an aluminum frame portion provided integrally on an outer portion of the seating portion in a longitudinal direction of the heat dissipation plastic frame portion.

To maintain the insulation of the aluminum frame portion, the frame structure may further include an oxide coating layer made of alumina ($Al_2O_3$) provided by anodizing of a surface of the aluminum frame portion, or the surface of the aluminum frame portion may have protrusions and recesses.

The frame structure may further include an insulating plastic plate insert-injected in the heat dissipation plastic frame portion. Each of the pair of batteries may be a pouch battery, with electrode terminals of the pouch battery being plated on and in contact with the insulating plastic plate.

To rapidly dissipate heat generated by the batteries, the frame structure may further include a heat dissipation metal plate insert-molded in the heat dissipation plastic frame portion.

The heat dissipation metal plate may be insert-molded in an area of the heat dissipation plastic frame portion adjacent to the seating portion.

One surface of the heat dissipation metal plate may be exposed externally to be in contact with a heat exchanger, such as a cooling module, so as to rapidly transfer heat from inside to the heat exchanger, thereby improving heat dissipation efficiency.

The frame structure may further include a thermal interface material (TIM) insert-injected in the seating portion of the heat dissipation plastic frame portion.

The seating portion may include a projection protruding from the wall of the accommodating through-hole to horizontally halve the wall of the accommodating through-hole.

The heat dissipation plastic may include a moldable resin in which an insulating heat sink filler is distributed. The depth of the accommodating through-hole may be substantially the same as or greater than the thickness of the pair of batteries.

According to an embodiment of the present invention, a heat dissipation cartridge may include: heat dissipation plastic frame portions made of a heat dissipation plastic, including a seating portion surrounding an accommodating through-hole in which a pair of batteries are accommodated, and disposed on both longitudinal ends of the heat dissipation cartridge; and a pair of aluminum frame portions provided integrally on outer portions of the seating portions in a longitudinal direction of the heat dissipation plastic frame portions.

According to an embodiment of the present invention, a battery pack for an electric vehicle may include the above-described plurality of heat dissipation cartridges stacked on one another.

Advantageous Effects

According to the present invention, the heat dissipation cartridge can be provided by injection-molding heat dissipation plastic frame portions by inserting inexpensive aluminum frames in the aluminum frame portions, thereby significantly reducing manufacturing cost. This can also improve heat dissipation characteristics, improve strength, and prevent deformation.

According to the present invention, shorter frame areas of the heat dissipation cartridge are provided by injection-molding the heat dissipation plastic, while longer frame areas of the heat dissipation cartridge are provided by inserting aluminum frames. This can consequently obtain uniform heat dissipation characteristics.

According to the present invention, a pair of batteries can be accommodated in an accommodating through-hole of the heat dissipation cartridge, the thickness of which is substantially the same as the thickness of the pair of batteries. Accordingly, a greater number of batteries can be accommodated in a predetermined area of the battery pack in which a number of heat dissipation cartridges is stacked, such that the battery pack has a slim and thin profile, is lightweight, and has high capacity.

According to the present invention, since a pair of batteries accommodated in the heat dissipation cartridge is in contact with or adjacent to a seating portion protruding the wall of the accommodating through-hole, heat generated by the batteries during operation can be rapidly dissipated through the seating portion.

According to the present invention, a thermal interface material (TIM) may be insert-injected or coupled to the seating portion of the heat dissipation plastic frame portions to reduce contact heat resistance, thereby facilitating heat dissipation.

According to the present invention, a metal plate having high thermal conductivity may be insert-molded in an area of the heat dissipation plastic frame portion adjacent to the seating portion, such that heat generated by batteries can be rapidly dissipated by the seating portion and the metal plate.

MODE FOR INVENTION

Hereinafter, reference will be made to embodiments of the present invention in detail, examples of which are illustrated in the accompanying drawings.

Figure 1:
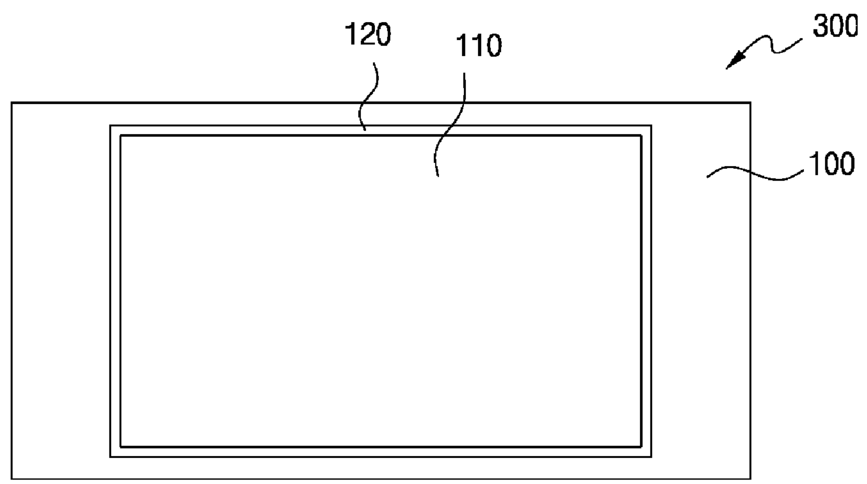
FIG. 1 is a plan view illustrating a heat dissipation cartridge according to a first embodiment of the present invention.

Referring to FIG. 1, a heat dissipation cartridge 300 according to a first embodiment of the present invention includes a frame structure 100 injection-molded from a heat dissipation plastic to accommodate a pair of batteries. The frame structure 100 has an accommodating through-hole 110 provided in a central area and a seating portion 120 provided on walls of the accommodating through-hole 110 to allow a pair of batteries to be accommodated.

The seating portion 120 is comprised of projections protruding from the walls of the accommodating through-hole 110 to horizontally halve the walls of the accommodating through-hole 110. The seating portion 120 allows a pair of batteries to be inserted through the top and bottom portions of the frame structure 100, thereby being accommodated in the accommodating through-hole 110.

The seating portion 120 may be provided along the walls of the accommodating through-hole 110. In some cases, the seating portion 120 may be provided as a plurality of separate portions distributed on a plurality of areas of the walls of the accommodating through-hole 110.

The batteries may be thin pouch batteries that have high energy concentration, enable high-power driving, and are electrically charged and discharged. Such pouch batteries are respectively fabricated by putting two electrodes, a separator, and a dielectric into a pouch and then sealing the pouch.

The heat dissipation plastic is implemented as a non-insulation moldable resin in which an electrically-conductive heat sink filler made of graphene, carbon, or the like is distributed or an insulation moldable resin in which an insulating heat sink filler made of BN, AlN, MgO, $Al_2O_3$, $SiO_2$, or the like is distributed. The heat dissipation plastic may generally be defined as an injection moldable insulating heat dissipation plastic including the insulating heat sink filler. Such a heat dissipation plastic dissipates heat transferred thereto via the insulating heat sink filler and has insulation due to the insulating heat sink filler and the resin.

Thus, the heat dissipation cartridge 300 including the heat sink filler can dissipate heat generated during charging and discharging of the batteries. Here, heat transferred to the heat dissipation cartridge 300 is removed by a heat exchanger. The heat exchanger may be any heat exchanger that can lower the temperature of the heat dissipation cartridge 300. Examples of the heat exchanger may be, but are not limited to, an air-cooling heat exchanger, such as a cooling fan, and a water-cooling heat exchanger using cooling water.

Accordingly, the present invention has an advantage in that heat generated by the batteries can be efficiently dissipated using the heat dissipation cartridge 300 to which the batteries are fitted.

Figure 2:
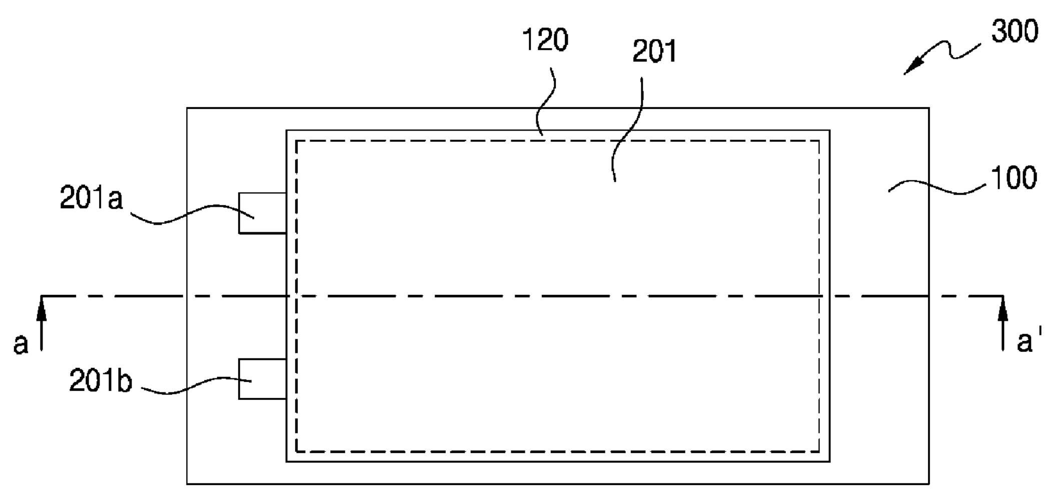
FIG. 2 shows the heat dissipation cartridge of FIG. 1 and a battery inserted and fitted therein.

Referring to FIG. 2, the heat dissipation cartridge 300 seats and accommodates a first battery 201 in one of the halved areas of the accommodating through-hole 110 by inserting the first battery 201 into the seating portion 120 from above the frame structure 100, and seats and accommodates a second battery (not shown) in the other halved area of the accommodating through-hole 110 by inserting the second battery into the seating portion 120 from below the frame structure 100.

Here, electrode terminals of the first and second batteries 201 are in close contact with the frame structure 100, instead of remaining within the accommodating through-hole 110. As illustrated in FIG. 2, the electrode terminals 201*a* and 201*b* of the first battery 201 are in close contact with the frame structure 100 of the heat dissipation cartridge.

When the first and second batteries 201 are pouch batteries, more heat is generated by peripheral areas than by inner areas of the pouch batteries.

Thus, the present invention has a structural characteristic in that the seating portion 120 of the frame structure 100 is located between the peripheral area of the first battery 201 and the peripheral area of the second battery in order to dissipate heat, generated during charging and discharging of the first and second batteries 201, through the peripheral areas of the first and second batteries 201.

Figure 3:
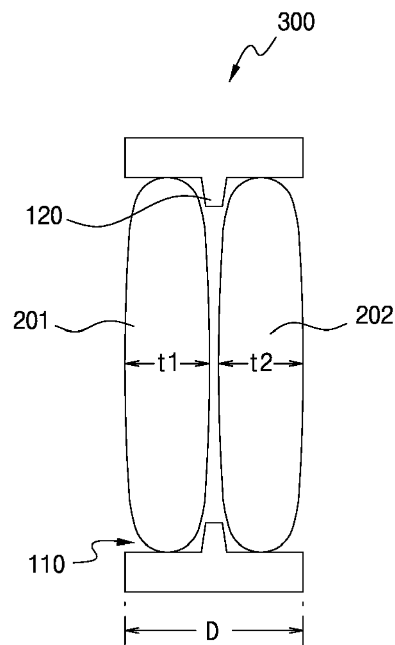
FIG. 3 is a cross-sectional view taken along the line a-a' in FIG. 2 and shows a pair of batteries inserted into the heat dissipation cartridge.

FIG. 3 is a cross-sectional view taken along line a-a' in FIG. 2 in order to illustrate a position in which a pair of batteries are fitted to the heat dissipation cartridge according to the first embodiment of the present invention.

That is, the heat dissipation cartridge 300 accommodates first and second batteries 201 and 202 in the accommodating through-hole 110 of the frame structure 100.

Thus, the accommodating through-hole 110 of the heat dissipation cartridge 300 may be divided into two areas by the seating portion 120 located between the peripheries of the first and second batteries 201 and 202, such that the first and second batteries 201 and 202 may be accommodated in the divided two areas, thereby leading to proper assembly alignment.

The heat dissipation cartridge 300 is designed such that two batteries, i.e. the first and second batteries 201 and 202, are accommodated in the accommodating through-hole 110. Here, the depth D of the accommodating through-hole 110 of the heat dissipation cartridge 300 may be substantially the same as or slightly greater than a total thickness t1+t2 of the two batteries 201 and 202.

Thus, no batteries 201 protrude from surfaces of the heat dissipation cartridge 300 on which other heat dissipation cartridges are to be stacked.

Figure 4:
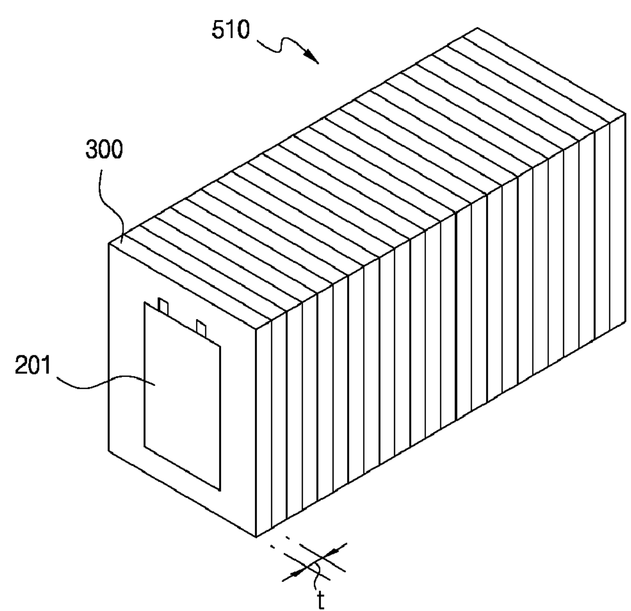
FIG. 4 is a conceptual perspective view illustrating a battery pack for an electric vehicle according to the present invention.

As illustrated in FIG. 4, a plurality of heat dissipation cartridges 300 according to the first embodiment of the present invention may be stacked on one another, thereby providing a battery pack 510 for an electric vehicle.

Accordingly, the present invention can provide the battery pack 510 for an electric vehicle, assembled by stacking the plurality of heat dissipation cartridges 300, with a pair of batteries 201 being fitted to each of the heat dissipation cartridges 300. The thickness of the battery pack 510 for an electric vehicle may be substantially the same as the thickness of the stacked heat dissipation cartridges 300 (i.e. the thickness t of the heat dissipation cartridge 300 illustrated in FIG. 4 is substantially the same as the thickness of a pair of batteries). Accordingly, the battery pack 510 for an electric vehicle according to the present invention can have a slim and thin profile and also be lightweight, thereby advantageously obtaining high capacity.

For example, in the case that the battery pack for an electric vehicle is provided with one hundred fifty (150) batteries, when heat dissipation fins or heat dissipation plates of the related art made of aluminum (Al) are sandwiched between the batteries, one hundred forty nine (149) heat dissipation fins or plates are necessary. This may accordingly make it impossible to reduce the weight and thickness of the battery pack. Since a predetermined number of batteries equal to the volumes occupied by the 149 heat dissipation fins or plates cannot be fitted, the capacity of the battery pack is reduced.

Figure 5:
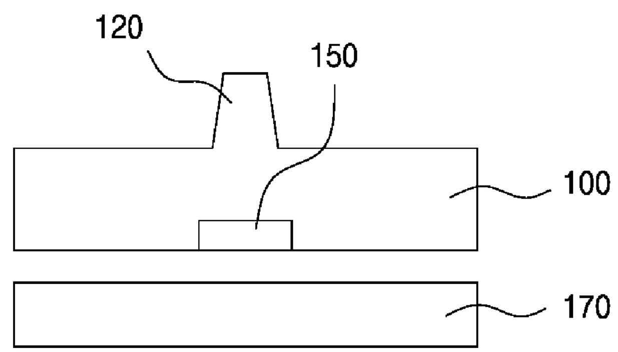
FIG. 5 is a cross-sectional view illustrating a portion of the heat dissipation cartridge of FIGS. 1, 2 and 3, with a metal plate being provided on the heat dissipation cartridge.

Referring to FIG. 5, in the heat dissipation cartridge 300 according to the first embodiment of the present invention, a heat dissipation metal plate 150 having high heat conductivity may be insert-molded in the frame structure 100 of the heat dissipation cartridge.

Here, the heat dissipation metal plate 150 may be insert-molded in an area of the frame structure 100 adjacent to the seating portion 120. More specifically, the heat dissipation metal plate 150 may be insert-molded in an area of the frame structure 100 corresponding to the seating portion 120, i.e. an area of the frame structure 100 facing the seating portion 120 protruding from the walls of the accommodating through-hole of the frame structure 100, such that heat generated by the batteries can be rapidly dissipated by the seating portion 120 and the heat dissipation metal plate 150.

The heat dissipation metal plate 150 may be made of Al or an Al alloy, which has superior heat conductivity while being inexpensive.

Since the seating portion 120 of the frame structure 100 in the heat dissipation cartridge is located between the peripheral areas of the batteries to dissipate heat generated by the batteries as described above, the heat dissipation metal plate 150 may be insert-molded in a position most adjacent to the seating portion 120.

In this case, one surface of the insert-molded heat dissipation metal plate 150 is exposed externally to be in contact with a heat dissipation module.

That is, as illustrated in FIG. 5, the heat dissipation metal plate 150 may be located on the frame structure 100 below the seating portion 120, such that heat transferred to the seating portion 120 from the batteries can be rapidly transferred to the heat exchanger 170 of the heat dissipation module through the heat dissipation metal plate 150.

Figure 6A:
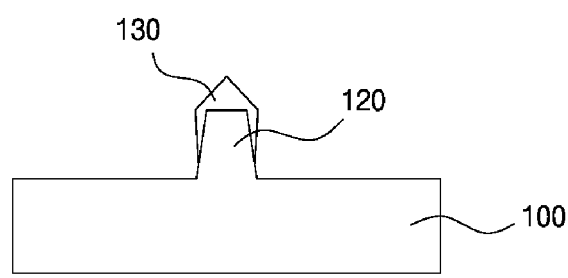
FIGS. 6*a* and 6*b* are cross-sectional views respectively illustrating the seating portion of the heat dissipation cartridge of FIGS. 1, 2 and 3 where a TIM or TIMs are coupled to the seating portion.

As illustrated in FIG. 6*a*, in the heat dissipation cartridge according to the present invention, a thermal interface material (TIM) 130 may be provided to surround the seating portion 120 of the frame structure 100 by insert molding.

Figure 6B:
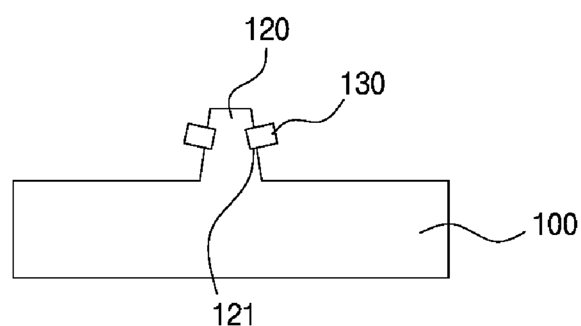

In addition, as illustrated in FIG. 6*b*, the seating portion 120 may be provided with coupling recesses 121, and TIMs 130 may be fitted to the coupling recesses 121.

When the TIM 130 is insert-molded on the seating portion 120 or TIMs 130 are fitted to the coupling recesses 121 as described above, contact heat resistance may be reduced and an air gap between a pair of batteries may be reduced, thereby facilitating heat dissipation to the outside heat exchanger.

The TIM 130 may be implemented as one of a variety of examples, such as heat dissipation grease, a heat dissipation sheet, a metal plate, and a thermally conductive adhesive.

A heat dissipation cartridge 600 according to a second embodiment of the present invention is provided by combining a breakthrough cartridge structure and a breakthrough material, i.e. a greater number of batteries can be mounted in the same area due to improved battery mounting efficiency, and manufacturing cost can be reduced due to an aluminum frame portion being insert-molded in a heat dissipating molded plastic structure.

Figure 7:
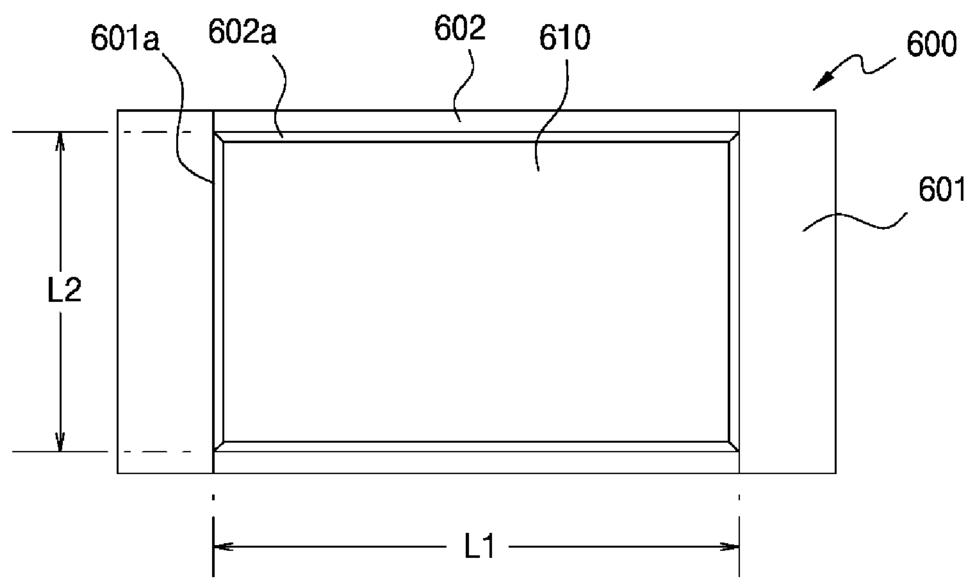
FIG. 7 is a plan view illustrating a heat dissipation cartridge according to a second embodiment of the present invention.

FIG. 7 shows a plan view of a heat dissipation cartridge according to a second embodiment of the present invention. Referring to FIG. 7, the heat dissipation cartridge 600 has a rectangular frame structure including an accommodating through-hole 610 provided in a central area and seating portions 601*a* and 602*a* provided on walls of the accommodating through-hole 610 to accommodate a pair of batteries, one of which is seated on one side of the seating portions and the other one of which is seated on the other side thereof. The frame structure is molded from a heat dissipation plastic in which aluminum frame portion 602 is insert-molded.

The rectangular frame structure includes heat dissipation plastic frame portions 601 and the aluminum frame portion 602. The heat dissipation plastic frame portion 601 and the aluminum frame portion 602 have the seating portions 601*a* and 602*a*, respectively, surrounding the accommodating through-hole 610 in which the pair of batteries are accommodated. The pair of aluminum frame portions 602 is provided integrally with the heat dissipation plastic frame portions 601, for example, an insert-injection molding process as previously described.

For example, the batteries are rectangular-shaped, and thus the accommodating through-hole 610 and the seating portions 601*a* and 602*a* form a rectangular shape.

The rectangular seating portions 601*a* and 602*a* are comprised of the pair of first seating portions 601*a* disposed to face each other in the accommodating through-hole 610 and the pair of second seating portions 602*a* 610 to connect both ends of the first seating portions 601*a*, thereby forming a rectangular seating portion.

Here, the frame structure is also a rectangular frame structure, in which the length L1 of the aluminum frame portions 602 is longer than the length L2 of the heat dissipation plastic frame portions 601.

When the frame structure of the heat dissipation cartridge 600 is injection-molded from an expensive heat dissipation plastic, the marketability thereof may be lowered due to increased manufacturing cost. According to the present invention, the heat dissipation cartridge 600 can be provided by injection-molding the heat dissipation plastic frame portions 601 by inserting the inexpensive aluminum frame portions 602, thereby significantly reducing manufacturing cost.

In addition, when the heat dissipation cartridge 600 is manufactured by only injection-molding the heat dissipation plastic, a heat sink filler distributed in a resin of the heat dissipation plastic may be concentrated in a local area in the heat dissipation cartridge 600 during injection of the heat dissipation plastic into a mold, since the heavier heat sink filler has inferior flowability to the resin.

Accordingly, in the present invention, shorter frame areas of the heat dissipation cartridge 600 are provided as the heat dissipation plastic frame portions 601 by injection-molding the heat dissipation plastic, while longer frame areas of the heat dissipation cartridge 600 are provided by inserting aluminum frame portions 602. This can reduce the magnitude of injection molding, such that the heat dissipation plastic frame portions 601 can be imparted with more uniform heat dissipation characteristics.

In addition, the aluminum frame portions 602 can improve heat dissipation characteristics of the heat dissipation cartridge 600, due to a higher heat conduction characteristic than the heat dissipation plastic frame portions 601.

Furthermore, when the frame structure is manufactured by injection-molding the heat dissipation plastic frame portions 601 by inserting the aluminum frame portions 602 therein as in the present invention, instead of being provided only using the heat dissipation plastic frame portions 601 injection-molded from the heat dissipation plastic, the frame structure can have superior strength and can prevent deformations, such as distortion, due to external force.

Since the heat dissipation cartridge 600 has a rectangular frame structure comprised of the heat dissipation plastic frame portions 601 and the aluminum frame portions 602 defining the accommodating through-hole 610 therein, each of the heat dissipation plastic frame portions 601 and the aluminum frame portions 602 has a wall of the accommodating through-hole 610, and the first and second seating portions 601*a* and 602*a* are provided on the walls.

Here, the seating portions 601*a* and 602*a* are projections protruding from the walls of the accommodating through-hole 610 to horizontally halve the walls of the accommodating through-hole 610. The seating portion 601*a* and 602*a* allow a pair of batteries to be inserted through the top and bottom portions of the frame structure, thereby being accommodated in the accommodating through-hole 610.

The seating portions 601*a* and 602*a* may be provided along the walls of the accommodating through-hole 610. In some cases, the seating portions 601*a* and 602*a* may be provided as a plurality of separate portions distributed on a plurality of areas of the walls of the accommodating through-hole 610.

The batteries may be pouch batteries as in the first embodiment, while the heat dissipation plastic may be implemented as a non-insulation moldable resin in which an electrically-conductive heat sink filler is distributed or an insulation moldable resin in which an insulating heat sink filler is distributed. The heat dissipation plastic dissipates transferred heat using the insulating heat sink filler and has insulation due to the insulating heat sink filler and resin.

Thus, the heat dissipation cartridge 600 including the heat sink filler can dissipate heat generated during charging and discharging of the batteries. Here, heat transferred to the heat dissipation cartridge 600 is removed by a heat exchanger. The heat exchanger may be any heat exchanger that can lower the temperature of the heat dissipation cartridge 600. Examples of the heat exchanger may be, but are not limited to, an air-cooling heat exchanger, such as a cooling fan, and a water-cooling heat exchanger using cooling water.

Accordingly, the present invention has an advantage in that heat generated by the batteries can be efficiently dissipated using the heat dissipation cartridge 600 to which the batteries are fitted.

Figure 8:
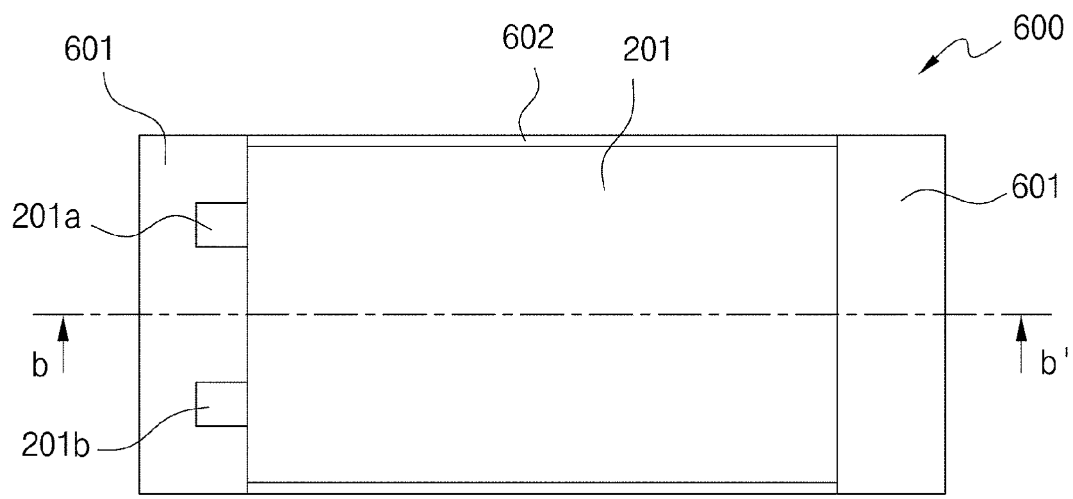
FIG. 8 shows the heat dissipation cartridge of FIG. 7 and a battery inserted and fitted therein.

Referring to FIG. 8, the heat dissipation cartridge 600 seats and accommodates a first battery 201 in one of the halved areas of the accommodating through-hole 610 by inserting the first battery 201 into the seating portions 601*a* and 602*a* from above the frame structure, and seats and accommodates a second battery (not shown) in the other halved area of the accommodating through-hole 610 by inserting the second battery into the seating portions 601*a* and 602*a* from below the frame structure.

Here, electrode terminals of the first and second batteries 201 are in close contact with the frame structure, instead of remaining within the accommodating through-hole 610. As illustrated in FIG. 8, the electrode terminals 201*a* and 201*b* of the first battery 201 are in close contact with the heat dissipation plastic frame portions 601 of the heat dissipation cartridge 600.

The seating portions 601*a* and 602*a* are provided on the heat dissipation frames 610 and the aluminum frame portions 602.

When the first and second batteries 201 are pouch batteries, more heat is generated by peripheral areas than by inner areas of the pouch batteries.

Thus, the present invention has a structural characteristic in that the seating portions 601*a* and 602*a* of the frame structure are located between the peripheral area of the first battery 201 and the peripheral area of the second battery in order to dissipate heat, generated during charging and discharging of the first and second batteries 201, through the peripheral areas of the first and second batteries 201.

Figure 9:
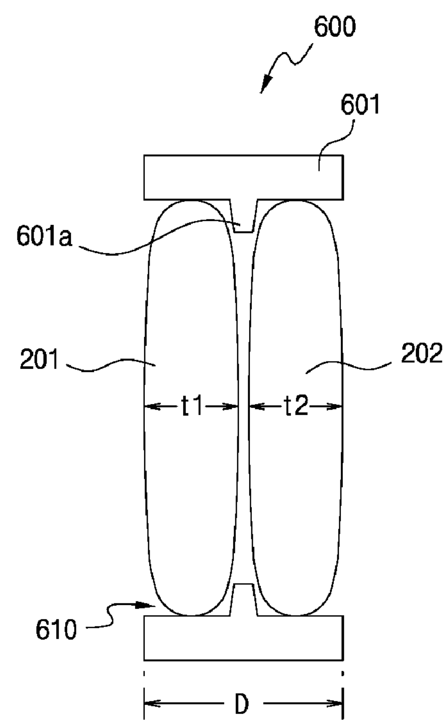
FIG. 9 is a cross-sectional view taken along the line b-b' in FIG. 8 and shows a pair of batteries inserted into the heat dissipation cartridge.

FIG. 9 is a cross-sectional view taken along line b-b' in FIG. 8 in order to illustrate a position in which a pair of batteries are fitted to the heat dissipation cartridge according to the second embodiment of the present invention.

That is, the heat dissipation cartridge 600 accommodates first and second batteries 201 and 202 in the accommodating through-hole 610 of the frame structure.

Thus, the accommodating through-hole 610 of the heat dissipation cartridge 600 may be divided into two areas by the seating portion 120 located between the peripheries of the first and second batteries 201 and 202, such that the first and second batteries 201 and 202 may be accommodated in the divided two areas, thereby leading to proper assembly alignment. In FIG. 9, the seating portions 601*a* provided on the heat dissipation plastic frame portions 601 are illustrated.

The heat dissipation cartridge 600 is designed such that two batteries, i.e. the first and second batteries 201 and 202 are accommodated in the accommodating through-hole 610. Here, the depth D of the accommodating through-hole 610 of the heat dissipation cartridge 600 may be substantially the same as or slightly greater than a total thickness t1+t2 of the two batteries 201 and 202.

No batteries 201 protrude from surfaces of the heat dissipation cartridge 600 on which other heat dissipation cartridges are to be stacked.

Figure 10:
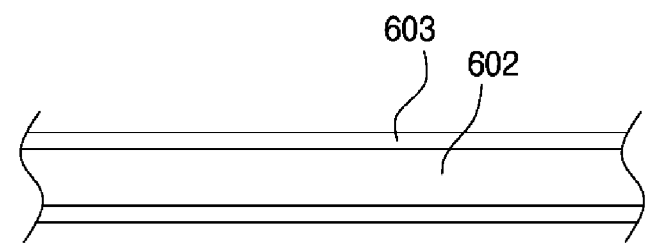
FIG. 10 is a cross-sectional view illustrating the aluminum frame portion used in the heat dissipation cartridge of FIGS. 7, 8 and 9 and an oxide coating layer formed on the aluminum frame portion.

FIG. 10 is a cross-sectional view illustrating a portion of the aluminum frame used in the heat dissipation cartridge according to the second embodiment of the present invention, coated with an oxide coating layer.

Referring to FIG. 10, the present invention can provide an oxide coating layer 603 made of alumina ($Al_2O_3$) on the surface of the aluminum frame portions 602 by anodizing the aluminum frame portions 602.

When a voltage is applied to the aluminum frame portion 602 immersed in an electrolyte, the oxide coating layer 603 made of alumina can be provided by anodizing of the aluminum frame portion 602.

The oxide coating layer 603 made of alumina can improve heat dissipation coefficient, i.e. a measure of heat dissipation capability, and have an insulation characteristic.

The electrolyte may be an acidic electrolyte although not limited thereto, and an alkali electrolyte is usable. Sulfuric acid, oxalic acid, phosphoric acid, or a mixture thereof may be used as the acidic electrolyte. The thickness of the oxide coating layer 603 required for insulation may be adjusted by controlling the time and current density of anodizing.

Figure 11:
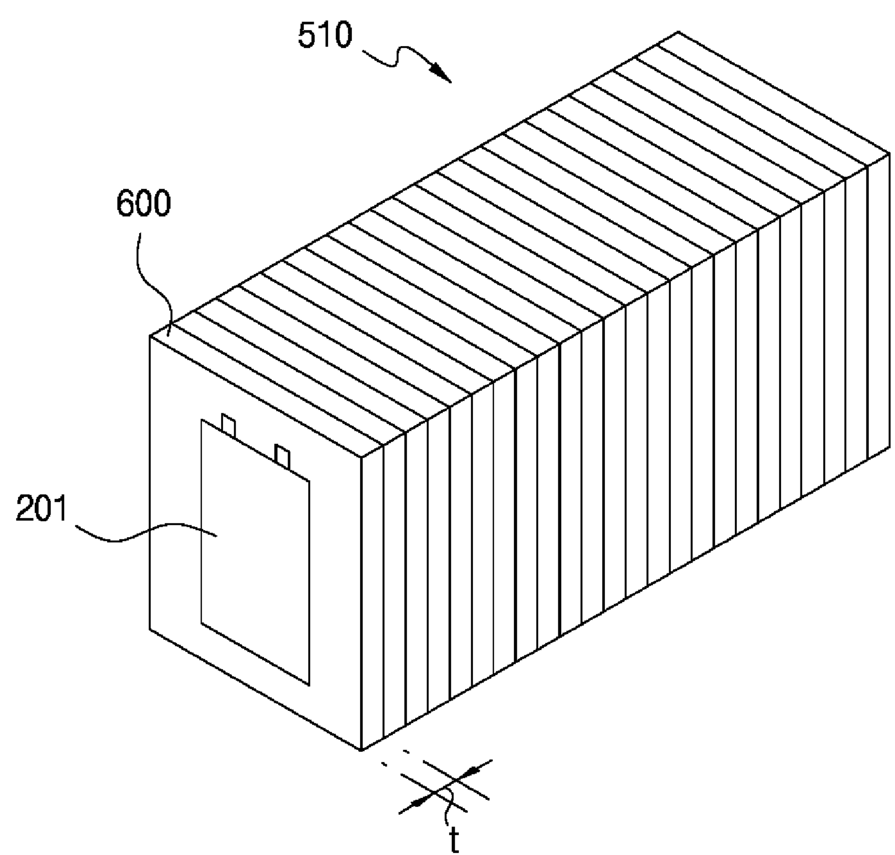
FIG. 11 is a conceptual perspective view illustrating a battery pack for an electric vehicle according to the second embodiment of the present invention.

As illustrated in FIG. 11, a plurality of heat dissipation cartridges 600 according to the second embodiment of the present invention may be stacked on one another, thereby providing a battery pack 510 for an electric vehicle.

Accordingly, the present invention can provide the battery pack 510 for an electric vehicle, assembled by stacking the plurality of heat dissipation cartridges 600, with the batteries 201 being fitted to each of the heat dissipation cartridges 600. The thickness of the battery pack 510 for an electric vehicle may be substantially the same as the thickness of the stacked heat dissipation cartridges 600 (i.e. the thickness t of the heat dissipation cartridge 600 illustrated in FIG. 5 is substantially the same as the thickness of a pair of batteries). Accordingly, the battery pack 510 for an electric vehicle according to the present invention can have a slim and thin profile and also be lightweight, thereby advantageously obtaining high capacity.

Like the heat dissipation cartridge 300 according to the first embodiment of the present invention illustrated in FIG. 5, the heat dissipation cartridge 600 according to the second embodiment of the present invention may further include heat dissipation metal plates insert-molded in areas of the heat dissipation plastic frame portions 601 facing the seating portions 601*a* protruding from the walls of the accommodating through-hole.

Figure 12:
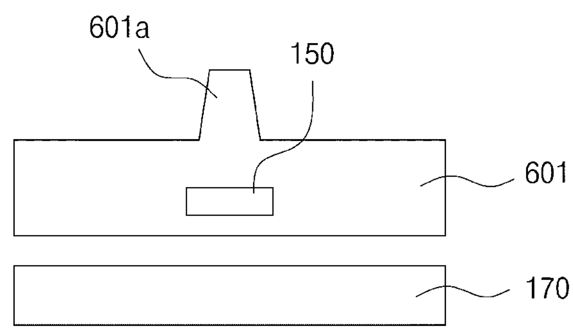
FIG. 12 is a cross-sectional view illustrating a portion of the heat dissipation cartridge of FIGS. 7, 8 and 9, with a metal plate being provided on the heat dissipation cartridge.

Referring to FIG. 12, according to the second embodiment of the present invention, a heat dissipation metal plate 150 having high heat conductivity may be insert-molded in the heat dissipation plastic frame portions 601.

Here, the heat dissipation plate 150 may be insert-molded in an area of the heat dissipation plastic frame portions 601 adjacent to the seating portion 601*a*. More specifically, the heat dissipation plate 150 may be insert-molded in an area of the heat dissipation plastic frame portions 601 corresponding to the seating portion 601*a*, i.e. an area of the heat dissipation plastic frame portions 601 facing the seating portion 601*a* protruding from the wall of the accommodating through-hole, such that heat generated by the batteries can be rapidly dissipated by the seating portion 601*a* and the heat dissipation plate 150.

The heat dissipation plate 150 may be made of Al or an Al alloy, which has superior heat conductivity while being inexpensive.

Since the seating portion 601*a* of the heat dissipation plastic frame portions 601 of the heat dissipation cartridge is located between the peripheral areas of the batteries to dissipate heat generated by the batteries as described above, the heat dissipation plate 150 may be insert-molded in a position most adjacent to the seating portion 601*a*.

In addition, one surface of the insert-molded heat dissipation metal plate 150 is exposed externally to be in contact with a heat dissipation module.

That is, as illustrated in FIG. 12, the heat dissipation plate 150 may be located on the heat dissipation plastic frame portions 601 below the seating portion 601*a*, such that heat transferred to the seating portion 601*a* from the batteries can be rapidly transferred to the heat exchanger 170 through the heat dissipation plate 150.

Figure 13A:
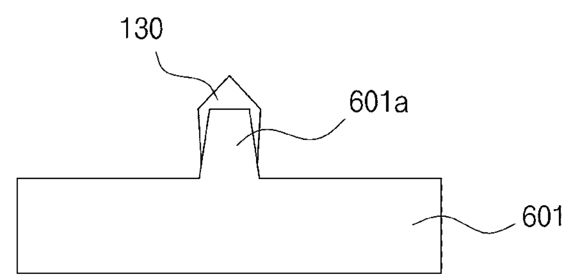
FIGS. 13*a* and 13*b* are cross-sectional views respectively illustrating the seating portion of the heat dissipation cartridge of FIGS. 7, 8 and 9 where a TIM or TIMs are coupled to the seating portion.

As illustrated in FIG. 13*a*, also in the heat dissipation cartridge according to the second embodiment of the present invention, a TIM 130 may be provided on the seating portion 601*a* of the heat dissipation plastic frame portions 601 by insert molding.

Figure 13B:
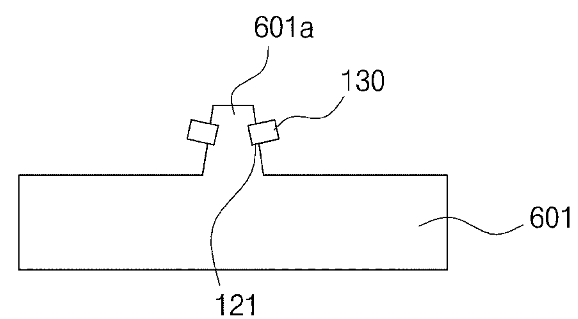

In addition, as illustrated in FIG. 13*b*, the seating portion 601*a* may be provided with coupling recesses 121, and TIMs 130 may be fitted to the coupling recesses 121.

When the TIM 130 is insert-molded on the seating portion 601*a* or TIMs 130 are fitted to the coupling recesses, contact heat resistance may be reduced and an air gap between a pair of batteries may be reduced, thereby facilitating heat dissipation to the outside heat exchanger.

The TIM 130 may be implemented as one of a variety of examples, such as heat dissipation grease, a heat dissipation sheet, a metal plate, and a thermally conductive adhesive.

Figure 14:
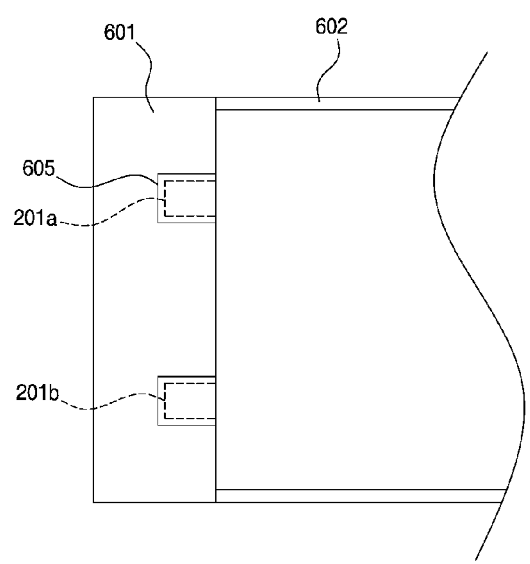
FIG. 14 is a plan view illustrating a portion of the heat dissipation plastic frame portion of the heat dissipation plastic of FIGS. 7, 8 and 9 where an insulating plastic is provided.

FIG. 14 is a top view illustrating a portion of the heat dissipation plastic frame portions of the heat dissipation plastic according to the second embodiment of the present invention, on which an insulating plastic is provided.

Referring to FIG. 14, electrode terminals 201*a* and 201*b* of a pouch battery are placed on and attached to the heat dissipation plastic frame portions 601.

According to the present invention, the heat dissipation plastic frame portions 601 may be injection-molded by inserting insulating plastic plates 605 in areas on which the electrode terminals 201*a* and 201*b* of the pouch battery are placed.

Accordingly, the electrode terminals 201*a* and 201*b* of the pouch battery are placed on and in contact with the insulating plastic plates 605.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

INDUSTRIAL APPLICABILITY

The heat dissipation cartridge and the battery pack according to the present invention can reduce manufacturing cost, improve heat dissipation performance, obtain uniform heat dissipation performance, obtain superior strength, and prevent deformation.

The invention claimed is:

1. A heat dissipation cartridge consisting of:

a frame structure formed of a pair of heat dissipation plastic frame portions disposed in parallel in a first direction and a pair of aluminum frame portions disposed in parallel in a second direction perpendicular to the first direction, wherein each of the aluminum frame portions consists of an aluminum material, end portions of one of the aluminum frame portions are fixed to one end portions of the heat dissipation plastic frame portions, and end portions of the other one of the aluminum frame portions are fixed to the other end portions of the heat dissipation plastic frame portions so as to form a rectangular shape of the frame structure:

an accommodating through-hole provided in a central area of the frame structure and having a rectangular shape; and a seating portion protruding from inner walls of the heat dissipation plastic frame portions and the aluminum frame portions inwardly towards the accommodating through-hole so that a pair of batteries can be accommodated in the accommodating through-hole, and one of the batteries can be seated on one side of the seating portion and the other one thereof can be seated on the other side of the seating portion.

2. The heat dissipation cartridge according to claim 1, wherein the aluminum frame portions include an anodized surface layer made of alumina ($Al_2O_3$).

3. The heat dissipation cartridge according to claim 1, wherein the heat dissipation plastic frame portions comprise: an insulating plastic plate insert-molded therein, and each of the pair of batteries is a pouch battery having electrode terminals, the electrode terminals being placed on and in contact with the insulating plastic plate.

4. The heat dissipation cartridge according to claim 1, wherein the heat dissipation plastic frame portions comprises: a heat dissipation metal plate insert-molded therein.

5. The heat dissipation cartridge according to claim 4, wherein the heat dissipation metal plate is placed adjacent to the seating portion.

6. The heat dissipation cartridge according to claim 1, wherein the heat dissipation plastic frame portions comprise: a thermal interface material (TIM) insert-molded in the seating portion thereof.

7. The heat dissipation cartridge according to claim 1, wherein the seating portion of the heat dissipation plastic frame portions have a coupling recess, and a thermal interface material is fitted into the coupling recess.

8. The heat dissipation cartridge according to claim 1, wherein the heat dissipation plastic frame portions are made of a resin and an insulating heat sink filler distributed in the resin.

9. The heat dissipation cartridge according to claim 1, wherein a depth of the accommodating through-hole is substantially a same as or greater than a thickness of the pair of batteries.

10. The heat dissipation cartridge according to claim 4, wherein a surface of the heat dissipation metal plate is exposed externally to be in contact with a heat dissipation module.

11. A battery pack for an electric vehicle comprising: a plurality of heat dissipation cartridges as claimed in claim 1, wherein the plurality of heat dissipation cartridges are stacked on top of another.

* * * * *